Dec. 4, 1923.  1,476,588

T. J. BROOKS

SANDING MECHANISM FOR MOTOR VEHICLES

Filed June 3, 1922

T. J. Brooks INVENTOR

BY Victor J. Evans ATTORNEY

WITNESSES

Patented Dec. 4, 1923.

1,476,588

UNITED STATES PATENT OFFICE.

THOMAS J. BROOKS, OF NASHVILLE, TENNESSEE.

SANDING MECHANISM FOR MOTOR VEHICLES.

Application filed June 3, 1922. Serial No. 565,564.

*To all whom it may concern:*

Be it known that I, THOMAS J. BROOKS, a citizen of the United States, residing at Nashville, in the county of Davidson and State of Tennessee, have invented new and useful Improvements in Sanding Mechanism for Motor Vehicles, of which the following is a specification.

The object of my said invention is to improve sanding mechanism for motor vehicles by the provision of means whereby on the normal operation of the pedal brake lever sand will be delivered on the roadway immediately in front of the drive wheels to enable the same to take hold of the road, and by the provision of means under the control of the vehicle driver whereby the supply of sand may be effectively retained in the sand holder and against waste as when the vehicle is travelling over a road where sanding is unnecessary.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
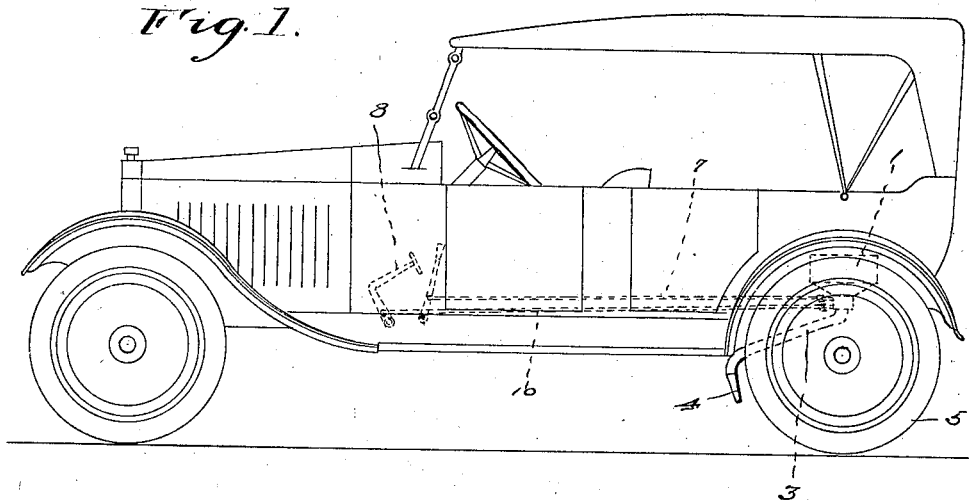
Figure 1 is a side elevation illustrating an automobile equipped with my improvement.
Figure 2:
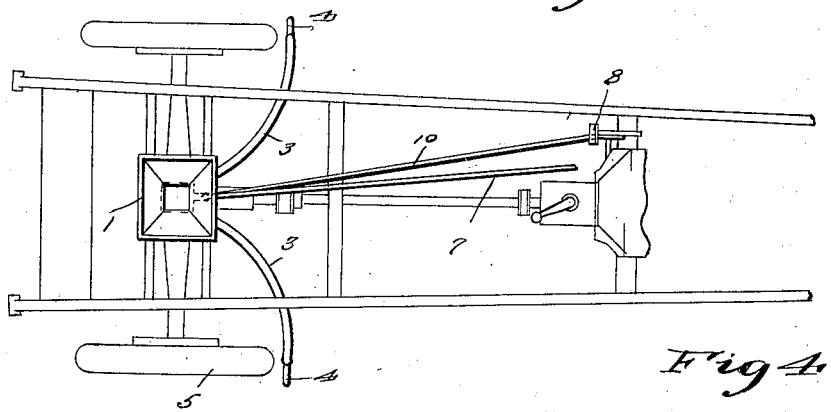
Figure 2 is a plan view of the same.
Figure 3:
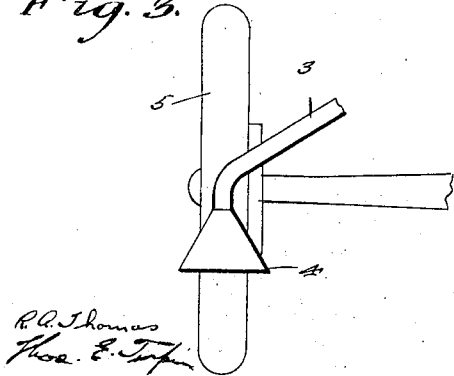
Figure 3 is a detail vertical section showing the arrangement of one of the sand nozzles relative to one of the drive wheels of the automobile.
Figure 4:
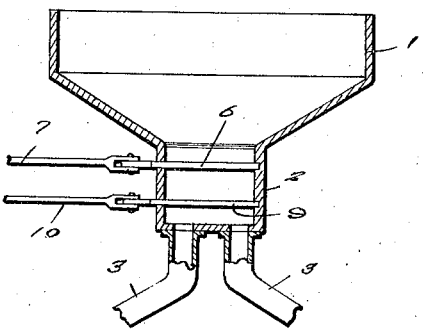
Figure 4 is a detail view illustrative of the preferred arrangement of the valves in the main conduit of the mechanism.

In furtherance of my invention I provide the automobile with a sand container 1, arranged by preference under the rear seat of the automobile. Leading downwardly from the contracted lower end of said container 1 is a main conduit 2, and communicating with and divergent from the lower end of the said main conduit 2 are branch conduits 3, the forward and lower ends of which are merged into nozzles 4, disposed immediately in front of the forward and lower portions of the rear drive wheels 5 and adjacent to the roadway as illustrated. The said nozzles 4 are flat and wide and are arranged with their greatest widths parallel to the ground so as to enable them to deposit on the roadway immediately in front of the wheels 5 paths of sand of a width of about six or eight inches.

Located in the main conduit 2 and adjacent to the lower end of the container 1 is a cut off valve 6. Connected to and extending forwardly from the said cut off valve 6 to a point within convenient reach of the driver of the automobile is a rod 7. Manifestly through the medium of the said rod 7 the driver of the motor vehicle is enabled to open and close the cut off valve 6, the scheme of my invention contemplating the retention of the valve 6 in closed state when the motor vehicle is operating under conditions in which it is unnecessary to deposit sand in the paths of the drive wheels 5, and the said scheme also contemplating the opening of the valve 6 when the conditions are such that it is necessary to deposit sand in front of the wheels 5 at intervals and particularly when the brake pedal 8 of the automobile is actuated to apply the brakes and retard or stop the motor vehicle. To meet the last-named conditions I provide before the valve 6 in the main conduit 2 a valve 9. The latter valve is connected as indicated by 10 with a brake pedal 8 so that when the brake pedal 8 is actuated the valve 9 will be open to discharge sand under the drive wheels 5, and when the brake pedal 8 is relieved of pressure the valve 9 will be closed. Manifestly the provision of the valve 9 in connection with the brake pedal 8 of the automobile constitutes an important feature of my invention, inasmuch as it assures the delivery of sand to the roadway when the sand is most needed, namely, when the brakes are applied for the retarding of the motor vehicle, and averts the discharge of any material portion of the sand at any other time.

Notwithstanding the practical advantages of my improvement it will be understood that the same is simple and inexpensive in construction; is susceptible of being made of light material so as not to materially increase the weight of an automobile, and is adapted to be applied at small expense to automobiles such as at present in use.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having thus described my invention, what I claim and desire to secure by Letters-Patent, is:—

The combination in a motor vehicle, of a sand container, means for conducting sand from said container to a point adjacent to the roadway and in front of one of the drive wheels, a pedal brake-actuating lever, a valve in the said conducting means, and a connection intermediate the brake pedal lever and the valve, constructed and arranged to open said valve on movement of the brake lever to apply the brakes and to close said valve on the return of the pedal brake lever to its normal position, with a valve arranged in said conducting means at a point between the container and the first-named valve and operable independently of said first-named valve and means connected to the second-named valve and extending to a point within convenient reach of the motor vehicle driver to enable him to cut off the supply of sand to the brake operated valve and to establish the said supply when necessary.

In testimony whereof I affix my signature.

THOMAS J. BROOKS.